United States Patent Office 3,078,873
Patented Feb. 26, 1963

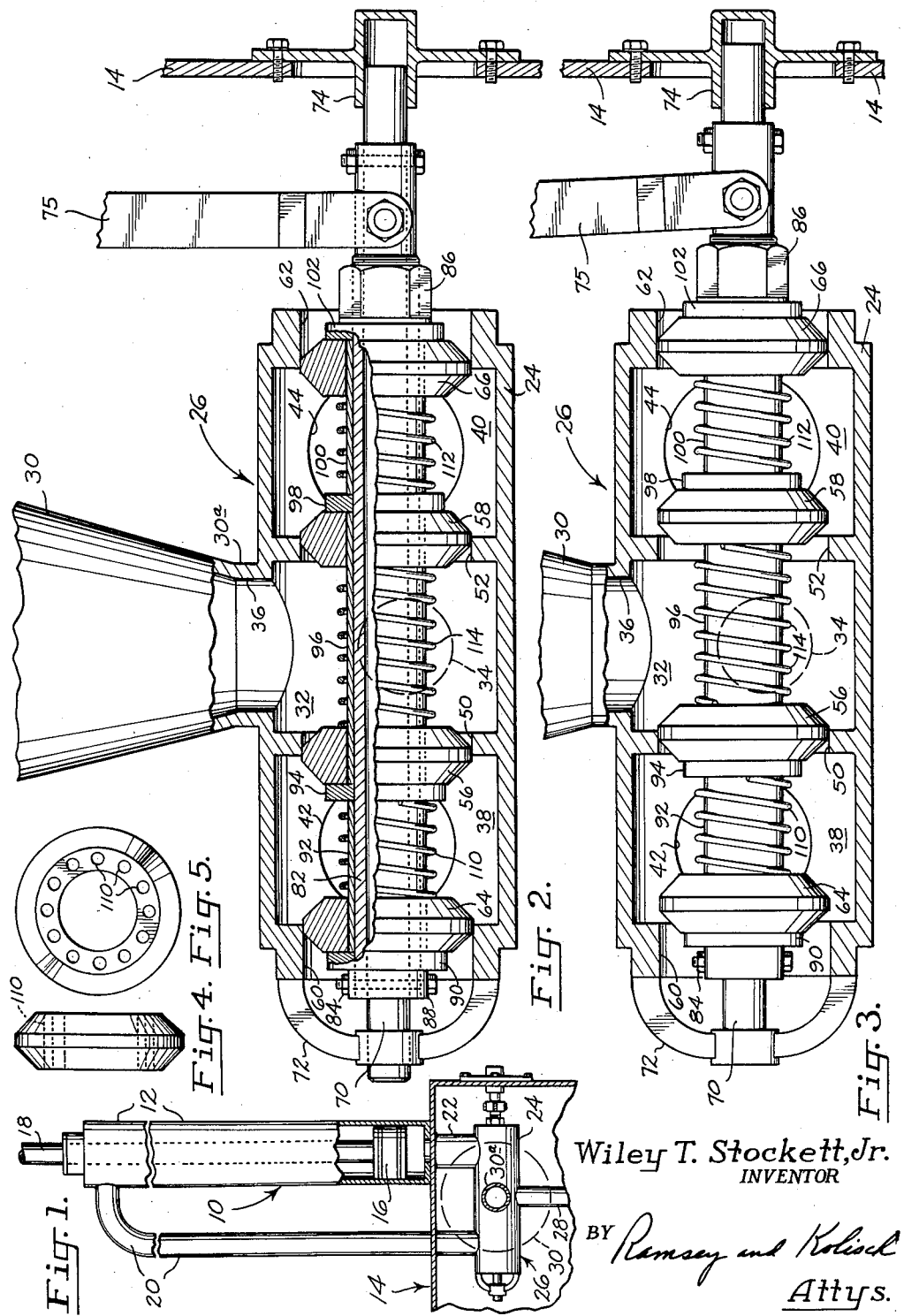

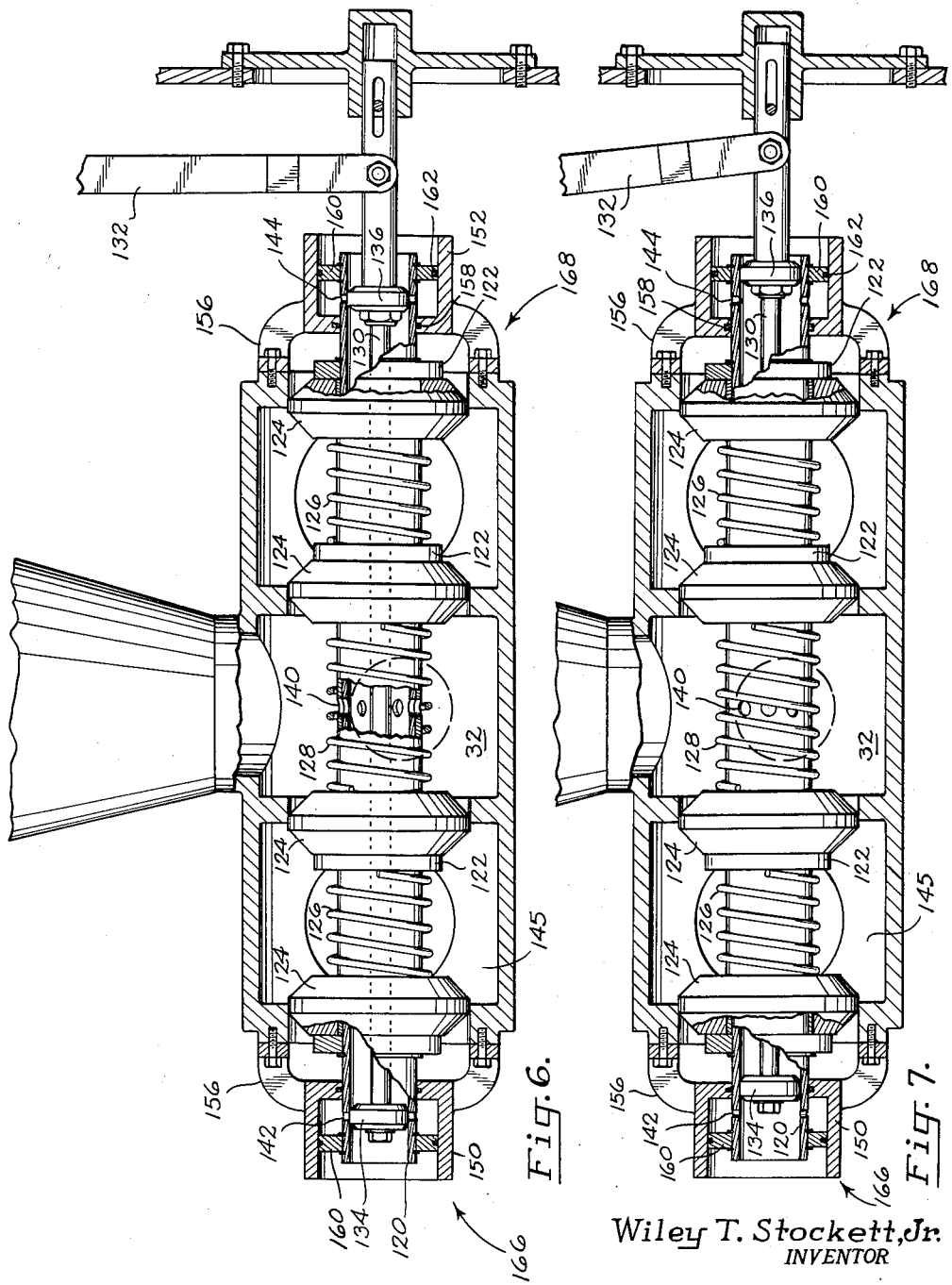

1

3,078,873
VALVE MECHANISM
Wiley T. Stockett, Jr., Greeley, Colo., assignor, by direct and mesne assignments, to George N. Hybertsen, Salem, Oreg., and Paul S. Hybertsen, Portland, Oreg.
Filed Nov. 21, 1960, Ser. No. 70,709
20 Claims. (Cl. 137—622)

This invention relates to valve mechanisms, and more particularly to a valve mechanism such as may be used in regulating the supply and exhaust of pressure fluid to and from a fluid motor.

A general object of the invention to provide, in a valve, mechanism to take care of the effects of momentum in a fluid motor when the supply of pressure fluid to one end thereof is suddenly cut off after a period of actuation. The valve provides for the admission and exhaust of controlled amounts of fluid to and from opposite ends of the motor after the valve is adjusted to cut off the motor whereby the motor may be smoothly braked to a stop.

It is common to use an expansible-contractible fluid motor to position an article or piece of machinery. For instance, the carriage of the lumber industry, metal planers, cranes and the like are often set up to be moved from time to time to selected positions using such fluid motors. Usually it is desirable that the selected positioning take place rapidly. The mass of the machinery and its velocity during movement have introduced problems, since the momentum resulting through movement must be overcome when the machinery reaches its final position and is made stationary. Any valve used selectively to control the admission and exhaust of pressure fluid to the motor, if it immediately on actuation completely closes off both the lines to the motor, subjects the motor and associated parts to considerable shocks and strains.

To overcome this difficulty, this invention contemplates a valve for regulating such an expansible-contractible fluid motor which comprises a housing and controlled fluid passages formed in the housing that in operation are connected to opposite ends of the motor. The valve housing is also provided with an inlet channel for introducing fluid under pressure to the valve, and exhaust means for discharging fluid from the valve. A series of ports are provided that connect the inlet channel means with the two controlled fluid passages, and each of these passages and the exhaust means. Shiftable valve closure heads are mounted in the housing for opening and closing these ports, and the closure heads are used to direct fluid under pressure to one or the other of the controlled fluid passages, with the other of the controlled fluid passages exhausting through the exhaust means. The mounting for the closure heads includes a shiftable actuating member, and retainers fixed thereon that positively engage the closure heads when the actuating member is employed to shift the closure heads in a direction opposed by fluid pressure in the valve, or against "positive" pressure heads. The closure heads are shifted in the opposite direction, or toward "negative" pressure heads, through connections with the actuating member that include yieldable springs. The springs accommodate shifting of the closure heads relative to the actuating member, when momentum in the motor controlled by the valve tends to produce a temporary reversal of the normal pressure heads in the valve. The shifting of the closure heads is used to feed controlled amounts of exhaust fluid into the end of a piston-cylinder motor that is producing suction immediately after deactuation because of overtravel of its piston. The relative shifting of the closure heads also provides an exhaust for the opposite end of this motor (the motor functioning as a pump immediately after deactuation), with fluid exhausting into the inlet channel supplying pressure fluid to the valve. Thus momentum of the motor parts and the

2 machinery connected thereto is used to produce fluid under pressure supplementing the pressure fluid of the supply.

An object of the invention, therefore, is to provide an improved valve that includes passages for the supply of pressure fluid to opposite ends of a motor, and control means for regulating these passages, this control means having pressure responsive means that accommodates, immediately after the valve is adjusted to deactuate a motor, one-way flow of fluid from exhaust into the end of the motor that prior to deactuation was the pressure end of the motor, and one-way flow of fluid from the opposite end of the motor into the supply conduit for the valve.

More specifically, it is an object of the invention to provide in a valve, such valve having controlled fluid passages for carrying the supply and exhaust for opposite ends of a motor and inlet and exhaust means for the supply and discharge of fluid to and from the valve, improved valve control means whereby either of the controlled fluid passages may be connected to the inlet means with the other being connected to the exhaust means, said valve control means including closure mechanism automatically adjustable when the motor functions as a pump immediately after its deactuation to accommodate flow of fluid from the exhaust means to the controlled fluid passage last handling the supply to the motor, and to accommodate flow of fluid from the passage last handling exhaust from the motor to the inlet means for the valve.

A still further object of the invention is to provide an improved valve construction of relatively simple design having closure heads regulating the supply and exhaust of fluid for opposite ends of an expansible-contractible fluid motor that also function as check valve means accommodating one-way flow from an exhaust means for the valve to the end of the motor that produces suction when the motor functions as a pump, and one-way flow of fluid from the opposite end of the motor to the pressure fluid supply means for the valve.

A still further object is to provide a novel valve construction that comprises closure heads for regulating fluid flow through ports in the valve, said closure heads being mutually aligned and mounted on a common actuation member, and wherein the closure heads are shifted in one direction by retainers fixed to the actuating member, and shifted in the opposite direction by yieldable means accommodating movement of the closure heads relative to the actuating member.

The valve of this invention commonly may be used to regulate large volumes of fluid at relatively high pressures. The valve also should afford an operator close control over any motor regulated by the valve. Thus a further feature of the valve of the invention is a construction wherein the valve closure heads, under the action of fluid under pressure in the valve, tend automatically to set themselves in a neutral position (in a position wherein the passages in the valve connecting with opposite ends of a motor are closed off). When the closure heads are adjusted from this position to produce actuation of a motor connected to the valve, fluid under pressure in the valve automatically resists further opening of the closure heads and urges return of the closure heads to their neutral position.

In an embodiment of the invention, it is an object to provide a valve construction wherein power-assist mechanism is provided for adjusting the position of the control or regulator means of the valve. This is particularly valuable where large volumes of fluid at relatively high pressure are being controlled.

A further object of the invention is the provision of power-assist mechanism for aiding in the positioning of the control means of a valve that utilizes controlled amounts of the pressure fluid regulated by the valve to supply the power actuating the power-assist mechanism.

Other objects, features and advantages are attained by the invention, which is described hereinbelow in conjunction with the accompanying drawings, wherein:

FIG. 1 is a top plan view, partly in section, showing a valve constructed according to this invention, with the valve connected to an expansible-contractible fluid motor of the sort that may be used for positioning a heavy piece of work machinery;

FIG. 2 is a side elevation of the valve in FIG. 1, slightly enlarged and with portions broken away to illustrate details of the valve construction;

FIG. 3 is a view similar to FIG. 2 but showing components of the valve in a different position;

FIG. 4 is a side view of a closure head constructed according to a modification of the invention;

FIG. 5 is an end view of the closure head illustrated in FIG. 4.

FIG. 6 illustrates a modified form of valve construction that includes power-assist mechanism to aid in the positioning of the closure heads; and FIG. 7 is similar to FIG. 6, and shows the control of the valve in a different position.

Referring now to the drawings, and with particular reference to FIG. 1, 10 indicates an expansible-contractible fluid motor. The motor has a cylinder 12 secured to an enlarged reservoir or tank 14, the latter holding the fluid for actuating the motor. Motor 10 also comprises a piston 16 mounted for reciprocation within cylinder 12 and connected to a piston rod 18. Tank 14 and cylinder 12 are mounted in fixed position, and piston rod 18 may be secured to a piece of machinery (not shown) with the machinery traveling to and fro in a path on expansion or contraction of the motor. Connected to opposite ends of the motor are conduits 20, 22 used for the supply and exhaust or discharge of fluid at opposite ends of the motor. Conduits 20, 22 are connected to a valve housing 24 for a valve mechanism, indicated generally at 26.

In the embodiment of the invention disclosed, valve mechanism 26 is mounted in a stationary position near the base of tank 14 and ordinarily submerged in the fluid for actuating motor 10, which may be water, oil or the like. Fluid is pumped from the interior of tank 14 to valve mechanism 26 and enters the valve mechanism by way of a supply conduit, indicated at 28. Conventional pump mechanism (not illustrated) is used to withdraw fluid from the tank and feed it under pressure to supply conduit 28. To reduce fluctuations in the pressure of the pressure fluid regulated by the valve mechanism, an accumulator 30 is provided that is disposed substantially directly over valve mechanism 26 (in FIG. 1, the base is shown in section at 30a and the body of the accumulator is indicated by a dotted outline). The accumulator is closed off completely, save for means as the base thereof (to be described) that connects the accumulator with conduit 28. The accumulator operates to store a body of fluid under pressure prior to its distribution to motor 10 as determined by the valve.

Referring now more specifically to FIGS. 1, 2 and 3, valve housing 24 is provided with a series of chambers in fluid communication with motor supply conduits 20, 22, supply conduit 28 and accumulator 30. A series of ports interconnects the various chambers, accommodating flow of fluid thereinbetween. Specifically, centrally of the housing is an enlarged chamber 32, which constitutes a pressure fluid chamber in the mechanism. The chamber opens by way of a port 34 to supply conduit 28, and by way of a port 36 with accumulator 30. Chamber 32, together with orifices 34, 36, thus constitute an inlet channel means for the delivery of fluid under pressure to the valve mechanism. Spaced to either side of pressure fluid chamber 32 are a pair of chambers 38, 40. Chamber 38 connects through a port 42 with conduit 20. Chamber 40 connects through a port 44 with conduit 22. The chambers, since they hold fluid passing to and from motor 10, are referred to as "controlled fluid" chambers or passages. Chamber 38 connects with the central pressure fluid chamber 32 through a port 50. Similarly, chamber 40 connects with the pressure fluid chamber through a port 52. These ports are opened and closed by closure heads 56, 58. The latter are disc-shaped parts that have outer diameters slightly smaller than the inner diameters of ports 50, 52. The peripheries of heads 56, 58 are snugly encompassed by the walls defining ports 50, 52. Connecting controlled fluid chamber 38 with the outside of housing 24 is a port 60. In a similar manner, connecting controlled fluid chamber 40 with the outside of housing 24 is a port 62. The housing, it will be remembered, normally is submerged in liquid held in tank 14, the tank acting as a reservoir. Thus ports 60, 62 constitute exhaust ports connecting chambers 38, 40 with an exhaust means (the interior of tank 14). Ports 60, 62 are opened and closed by closure heads 64, 66 that resemble closure heads 56, 58.

Ports 60, 62, 50, and 52 are mutually aligned. For adjusting the position of the various closure heads for these ports and thus for regulating fluid flow through the valve an actuating means 70 is provided that takes the form of a rod extending longitudinally of the valve housing. One end of rod 70 is mounted in a spider 72 integral with one end of the valve housing. The other end of rod 70 is slidably mounted in a sleeve 74 fixed to a wall of tank 14. The rod is shifted axially of housing 14 to effect movement of the closure heads. Handle 75 is provided for manually adjusting rod 70.

Encircling rod 70 is sleeve 82. This is secured at one end to rod 70 by ring member 88 and nut and bolt connection 84. Bounding the other end of rod 70 is a nut 86 that is screwed onto a threaded portion provided rod 70. Fitted over sleeve 82 intermediate ring member 88 and nut 86 are a series of retainers 90, 94, 98, 102 separated by spacer sleeve sections 92, 96, 100. The closure heads are provided with central bores that enable them to be mounted about the shift rod by sliding them over the outer surfaces of the sleeve sections 92, 96, 100. The closure heads are held with those of their sides that are disposed outwardly of chamber 32 abutting the retainers by coiled compression springs 110, 112 and 114. These springs yieldably accommodate movement of the closure heads relative to rod 70 toward the center of the valve, while urging them toward seating position against the retainers. The retainers, it should be noted, are fixed from movement axially of bar 70, and thus constitute shift means anchored or fixed on bar 70 for moving the closure heads toward central chamber 32.

The valve operates in the following manner. In FIG. 2, the regulator means for the valve, i.e., closure heads 56, 58, 64, 66, springs 110, 112, 114 and rod 70, is in a neutral position. In this position, pressure fluid is confined within the central pressure fluid chamber 32. The closure heads are constrained from moving outwardly by the retainers. Chamber 38 and conduit 20 are sealed off by heads 64, 56 (constituting a first valving means) and chamber 40 and conduit 22 are sealed off by heads 58, 66 (constituting a second valving means).

To cause fluid under pressure to flow from pressure fluid chamber 32 to chamber 40 and conduit 22, the actuating member or rod 70 is shifted from the position in FIG. 2 to the position in FIG. 3. Closure head 64 moves inwardly of port 60 to open chamber 38 to exhaust. Closure head 58 moves to the right of port 52 to connect chamber 32 and chamber 40. Ports 50 and 62 remain closed. In this position of the closure heads fluid flows from chamber 32 to chamber 40, and thence to the lower end of motor 10 in FIG. 1. Fluid exhausts from the upper end of motor 10 through chamber 38 and port 60. It should be noted that where the heads are moved in a direction opposed by fluid pressure, the heads are shifted by the anchored retainers that prevent axial shifting of the heads on rod 70.

When the valve regulator means subsequently is returned to the neutral position of FIG. 2, for the purpose of stopping actuation of motor 10, momentum in piston 16, rod 18 and parts connected thereto produces a suction in passage 22 and a build up in the pressure of fluid in passage 20. This is taken care of by the coiled springs that mount the closure heads (these springs constituting pressure responsive means). Suction in conduit 22 causes head 66 to move from right to left in FIG. 3 with compression of spring 112. This is accompanied by the flow of fluid from the tank 14 through exhaust port 62 into passage 22. On the other side of the valve, an increase in the pressure of the fluid in passage 20 and chamber 38 causes head 56 to move to the right with compression of spring 114. This accommodates the flow of fluid under pressure back into accumulator 30. The result of such a construction is the elimination of an abrupt stopping of the moving parts. The closure heads, in a manner of speaking, function as check valves permitting one-way flow in a reverse direction in the valve.

The mechanism operates in a similar manner when actuating rod 70 is shifted from right to left. Thus when rod 70 is shifted in this manner, pressure fluid is directed from chamber 32 into chamber 38 and exhaust takes place through conduit 22 and chamber 40. Similarly, when the regulating means is returned to the neutral position of FIG. 2, fluid may flow into chamber 38 on compression of spring 110, and fluid may flow from chamber 40 to chamber 32 on compression of spring 114.

It will be noted that in the neutral position for the regulator means, some movement of the closure heads occurs before an opening of the ports controlled thereby results. To produce some relief to pressures in motor conduits 20, 22 before the closure heads actually clear the ports, the modification of FIGS. 4 and 5 may be used. Referring to these figures, in this modification small bores or relief port means 116 are provided each closure head that extend axially through the closure head. Normally that side of a closure that faces away from chamber 32 abuts against a retainer. In this condition of the parts, bores 110 are closed off by the retainer. As soon as a closure head moves away from a retainer, bores 116 are opened. This type of construction permits one-way flow in a reverse direction thru the valve as soon as any axial shifting of the heads takes place.

As mentioned earlier, the valve mechanism of the invention is often used to regulate large volumes of fluid at relatively high pressure. At the same time, anyone operating the valve preferably should have close control over the flow of fluid through the valve. The regulator means of the valve just described tends automatically, by reason of the fluid pressures in the valve housing, to set itself in a neutral position, and tends to resist movement away from this position. This action has been found advantageous as an operator need not concern himself with any tendency of the regulator means to work itself to a position wherein motor 10 is actuated at an increased rate. Referring to FIG. 3, it will be seen that the exhaust port that is cracked open when the valve is actuated is moved away from exhaust and inwardly toward the center of the valve housing. It will also be noted that the closure head for the port connecting with chamber 32 that remains closed during such actuation is moved inwardly and into a head of relatively high pressure. With the parts in the condition of FIG. 3, pressure fluid in chamber 32 tends to urge closure head 56 to the left, and fluid exhausting through conduit 20 into chamber 38 tends to urge closure head 64 to the left. This results in a recentering tendency, and this tendency is present whenever the valve control means or regulator means is shifted from the neutral position of FIG. 2.

Referring now to FIGS. 6 and 7 these figures illustrate a modification of the invention where power-assist mechanism is provided to aid in the positioning of the closure heads. The mechanism uses a source of power controlled amounts of the pressure fluid regulated by the valve. In the embodiment of FIGS. 6 and 7, actuating member 70 is replaced by a hollow tube portion 120 having retainers 122 made fast thereon, and abutting these retainers, closure heads 124. These are urged against the retainers by springs 126, 128. The closure heads and springs open and close ports in the valve in the same manner as do the closure heads and springs discussed in connection with the first embodiment.

Extending down the center of tube portion 120 and shiftable axially of portion 120 is a rod portion 130. This is moved back and forth by handle 132, similar to handle 75. Spaced axially on the rod portion are valve heads 134 and 136. In the embodiment, tube portion 120 constitutes a follower member mounting the closure heads, and rod portion 130 constitutes a shiftable pilot member. Pressure fluid operated means is provided operatively connecting the pilot member and follower member whereby shifting of the pilot member is accompanied by a proportionate shifting of the follower member.

Specifically, extending through tube portion 120 and connecting the interior of the tube portion with pressure chamber 32 is a supply or feed passage 140. Outlet means or ports 142, 144 extend through the tube portion near the ends thereof. The spaced valve heads and the interior of hollow tube portion 120 define a retention chamber open to chamber 32 by conduit 140. Ports 142, 144 are closed off from this chamber by valve heads 134, 136 with the pilot member and follower in the relative position of FIG. 6.

A motor means is operatively connected to ports 142, 144 that is operable to reposition the follower with respect to the pilot member when the pilot member is shifted relative to the follower. In the embodiment illustrated, this takes the form of a pair of cylinder shells, 150, 152 concentric with tube portion 120 and made stationary on the housing as by spiders 156. Sealing the cylinder shells on the relatively movable tube portion 120 are seals 158. Secured as by snap rings to the ends of the tube portion (one at each end) are piston heads 160. Sealing the piston heads and the inside of the shells are seals 162. The piston heads and cylinder shells 150, 152 together form a pair of piston-cylinders at either end of the valve housing, indicated at 166 and 168. Outlets 142, 144 are for the supply and exhaust of fluid to and from these piston-cylinders.

In operation when the pilot member is shifted to the right relative to the follower, as shown in FIG. 7, outlet 144 opens to the interior of the retention chamber. Outlet 142 at the left of the valve opens to the interior of tank 14 or to exhaust. In this condition of the parts, pressure fluid flows into the right-hand piston-cylinder 168 and fluid flows out of left-hand piston-cylinder 166. As a result, movement of the follower to the right occurs until follower realigns itself with the pilot member. Similarly, when the pilot member is shifted to the left, outlet 144 connects with exhaust whereas outlet 142 connects the interior of the retention chamber. In this condition of the parts, pressure fluid causes expansion of the left piston-cylinder 166 with realignment of the follower and pilot member resulting.

The power-assist mechanism just described is particularly useful in conjunction with the valve mechanism of the invention, wherein the regulator means for the valve resists adjustment away from its neutral position. The pilot member may be shifted with the use of relatively small force, and the follower member quickly will reposition itself in alignment. The power-assist mechanism requires no secondary supply of fluid under pressure, but relies instead on the pressure fluid controlled by the valve to power it during its actuation.

The valve is relatively simple to manufacture. Absent are any levers or complicated structure within the valve for opening or closing the ports within the valve. The closure heads themselves are easily mounted in position by nesting them one after another on the rod or tube that supports them.

While there has been described specific embodiments of the invention, it is appreciated that changes may be made in the parts and/or their organization without departing from the spirit of the invention. It is intended to cover all modifications and variations that would be apparent to one skilled in the art, and that come within the scope of the appended claims.

It is claimed and desired to secure by Letters Patent:

1. Valve mechanism comprising a housing, said housing having a pair of controlled passages, inlet channel means for the supply of fluid under pressure to the housing and exhaust channel means for the exhaust of fluid from the housing, regulator means for the controlled passages mounted within the housing adjustable between an activating position wherein one of said controlled passages is connected to said inlet channel means and the other of said controlled passages is connected to said exhaust channel means and a neutral position wherein said one controlled passage is shut off from said inlet channel means and said other controlled passage is shut off from said exhaust channel means, said regulator means including one-way valve means interposed between said one controlled passage and said exhaust channel means and said other controlled passage and said inlet channel means, said one-way flow valve means accommodating flow of fluid from said exhaust channel means to said one controlled passage and from said other controlled passage to said inlet channel means when the pressure of fluid in said exhaust channel means exceeds the pressure of fluid in said one controlled passage and the pressure of fluid in said other controlled passage exceeds the pressure of fluid in said inlet channel means.

2. Valve mechanism comprising a housing, said housing having a pair of controlled passages, inlet channel means for the supply of fluid under pressure to the housing and exhaust channel means for the exhaust of fluid from the housing, and regulator means for the controlled passages mounted within said housing adjustable between a neutral position wherein both of said controlled passages are shut off from both said inlet channel means and said exhaust channel means and a pair of activating positions, said regulator means in one activating position connecting one of said controlled passages to said inlet channel means and the other of said controlled passages to said exhaust channel means and in the other activating position connecting said one controlled passage to said exhaust channel means and said other controlled passage to said inlet channel means, said regulator means including closure means automatically adjustable under a pressure differential to accommodate the flow of fluid through said controlled passages, said closure means accommodating one-way flow from said exhaust channel means to each of said controlled passages and one-way flow from each of said controlled passages to said inlet channel means when the pressure of fluid in said exhaust channel means exceeds the pressure of fluid in the controlled passage and when the pressure of fluid in the controlled passage exceeds the pressure of fluid in said inlet channel means, respectively.

3. Valve mechanism comprising a housing, said housing having a pair of controlled passages, inlet channel means for the supply of fluid under pressure to the housing and exhaust channel means for the exhaust of fluid from the housing, and regulator means for the controlled passages, said regulator means comprising first valving means for one of said controlled passages adjustable between a first position wherein said one controlled passage is shut off from said inlet channel means and said exhaust channel means, a second position wherein said one controlled passage is open to said inlet channel means only and a third position wherein said one controlled passage means is open to said exhaust channel means only, said regulator means also comprising second valving means for the other of said controlled passages adjustable between a first position wherein said other controlled passage is shut off from said inlet channel and said exhaust channel means, a second position wherein said other controlled passage is open to said inlet channel means only, and a third position wherein said other controlled passage is open to said exhaust channel means only, said first valving means including means accommodating automatically and under a pressure differential one-way flow of fluid from said exhaust channel means to said one controlled passage and from said one controlled passage to said inlet channel means, said second valving means including means accommodating automatically and under a pressure differential one-way flow of fluid from said exhaust channel means to said other controlled passage and from said other controlled passage to said inlet channel means.

4. The valve mechanism of claim 3 wherein said first and second valving means are connected to a common actuating member, and both simultaneously are adjusted by adjusting said actuating member, and wherein said first valving means is adjusted to its third position and said second valving means is adjusted to its second position on shifting said actuating member in one direction and said first valving means is adjusted to its second position and said second valving means is adjusted to its third position on shifting of said actuating member in the opposite direction.

5. Valve mechanism for the control of an expansible-contractible fluid motor, said valve mechanism comprising a housing, said housing having a pair of passages adapted operatively to be connected to opposite ends of the motor, one passage to one end and the other passage to the other end of said motor, inlet channel means for the supply of fluid under pressure to the housing and exhaust means for the exhaust of fluid from the housing, an inlet port connecting each of said pair of passages to said inlet channel means, an exhaust port connecting each of said pair of passages to said exhaust means, closure means for each port and mounting means mounting the several closure means in a neutral position wherein each closes its respective port, said mounting means including adjustment mechanism for adjusting the closure means to positions away from said neutral position, said closure means in one position of adjustment opening the port connecting said one passage and said exhaust means and opening the port connecting said outer passage and said inlet channel means, said closure means in another position of adjustment opening the port connecting said other passage and the exhaust means and opening the port connecting said one passage and said inlet channel means, said mounting also including pressure responsive means whereby the closure means for the ports connecting the exhaust means and the pair of passages open when the pressure of fluid in said exhaust means exceeds the pressure of fluid in said pair of passages and the closure means for the ports connecting the pair of passages and said inlet channel means open when the pressure of fluid in said pair of passages exceeds the pressure of fluid in said inlet channel means.

6. The valve of claim 5 wherein said mounting means comprises a shiftable follower member mounting the closure means for each port and wherein said adjustment mechanism comprises a shiftable pilot member, and pressure fluid operated means connecting the pilot member and follower member whereby shifting of the pilot member is accompanied by a proportionate shifting of the follower member, said pressure fluid operated means having a supply passage therefor which connects with said inlet channel means.

7. The valve mechanism of claim 5 wherein each closure means is provided with relief port means opened on actuation of said pressure responsive means.

8. Valve mechanism comprising a valve housing, a pressure fluid chamber within the housing, inlet channel means connected thereto, a pair of controlled fluid chambers and a port connecting each of the latter and said pressure fluid chamber, exhaust means for the exhaust of fluid from the valve and a port connecting the same with each of said controlled fluid chambers, closure means for each port, and adjustable mounting means mounting each closure means with the latter closing their respective ports for one position of the adjustable mounting means, said adjustable mounting means including, for each closure means, pressure responsive means whereby each closure means may be moved to a position opening its port independently of adjustment of said adjustable mounting means, said pressure responsive means accommodating one-way flow of fluid from the exhaust means to the controlled fluid chambers and one-way flow of fluid from said controlled fluid chambers to said pressure fluid chamber.

9. The valve mechanism of claim 8 wherein each closure means includes relief port means normally closed when the closure means occupies a position closing its respective port but opened on actuation of its pressure responsive means.

10. The valve of claim 8 wherein the adjustable mounting means includes a common actuating member for shifting plural closure means simultaneously, and wherein for one position of the actuating member the port connecting the pressure fluid chamber and one of the controlled fluid chambers and the port connecting the exhaust and the other of the controlled fluid chambers are opened and for another position of the actuating member the port connecting the pressure fluid chamber and said other of the controlled fluid chamber and the port connecting the exhaust means and said one controlled fluid chamber are opened.

11. A valve comprising an elongated valve housing, a pressure fluid chamber formed centrally in the housing and an inlet connecting therewith, a pair of controlled fluid chambers spaced on either side of said pressure fluid chamber, a port connecting each controlled fluid chamber with the pressure fluid chamber, an exhaust port connecting with each controlled fluid chamber and disposed on either side of said feed ports, said ports being substantially aligned with each other within the valve housing, a closure head for each port for opening and closing the same, an elongated actuating member mounting the closure heads for adjusting the position of the closure heads, said actuating member including shift means for each closure head fixed thereon and engaging the closure heads for shifting positively said closure heads in a direction inwardly toward said central pressure fluid chamber, and resilient means yielding for urging said closure heads in a direction outwardly of said pressure fluid chamber against said shift means, said resilient means accommodating movement of each closure head relative to the actuating member inwardly in a direction toward said central pressure fluid chamber.

12. The valve of claim 11 wherein each closure head has at least one bore extending therethrough closed when the closure head engages its shift means and opened thus to accommodate the flow of fluid through the bore on movement of the head relative to said actuating member.

13. A valve comprising an elongated valve housing, a pressure fluid chamber formed centrally in the housing and having an inlet connecting therewith, a pair of controlled fluid chambers spaced on either side of said pressure fluid chamber, a feed port connecting each controlled fluid chamber with the pressure fluid chamber, an exhaust port connecting with each controlled fluid chamber and disposed on either side of said feed port, said ports being substantially aligned with each other within the valve housing, a closure head for each port for opening and closing the same, an elongated follower member mounting the closure heads and shiftable longitudinally of the valve housing to bring about adjustment in the position of the closure heads, a pilot member shiftable relative to the follower and mounted within the follower, a pair of spaced valve heads mounted on said pilot member and in sealing relationship with the interior of the follower and defining with the interior of the follower and between the valve heads a retention chamber, a pair of outlet means for said retention chamber formed in said follower and normally closed off from said retention chamber by said valve heads, a feed conduit connecting said retention chamber and said pressure fluid chamber, and motor means connected to said outlets operable to urge the follower to a position relative to the pilot member whereby both outlets are closed by said valve heads upon shifting of the pilot member relative to the follower to a position wherein either outlet is opened to said retention chamber.

14. In a valve having an elongated housing, plural chambers formed in the housing spaced along the length thereof and aligned longitudinally of the housing, and ports interconnecting the chambers, closure heads for the ports aligned longitudinally of the housing, elongated adjusting means mounting the closure heads, and means operatively connecting the adjusting means and closure heads whereby axial movement of the former produces shifting of the closure heads, said means comprising, for each closure head, a retainer anchored to the adjusting means and defining one position for the closure head relative to the adjusting means, and a spring urging the closure head against the retainer, said spring yielding accommodating movement of the closure head away from its retainer.

15. The valve of claim 14 wherein each closure head is provided with bores extending therethrough and normally closed when the closure head rests against its retainer, and opened by movement of the closure head away from its retainer.

16. In a valve for controlling the flow of fluid under pressure, a housing, a pressure fluid chamber formed in said housing and conduit means for introducing a supply of fluid under pressure thereto, a port connecting with said chamber, a closure head shiftable between an open and a closed position for opening and closing said port and thus for regulating the flow of fluid through said port from said chamber, and means for shifting said closure head between said positions, said means comprising a hollow follower member mounting said closure head and shiftable relative to said housing, a pilot member shiftable relative to said follower and mounted within said follower, a pair of spaced valve heads mounted on said pilot member in sealing relationship with said follower and defining with the interior of the follower and between the valve heads a retention chamber, a pair of outlet means for said retention chamber formed in said follower and normally closed off from said retention chamber by said valve heads, a feed conduit connecting said retention chamber and said pressure fluid chamber, and motor means connected to said outlets operable to urge the follower to a position relative to said pilot member wherein both outlets are closed by said valve heads upon shifting of said pilot member relative to said follower to a position wherein either outlet is opened to said retention chamber.

17. The valve of claim 16 wherein said follower member comprises a hollow tube with ends exposed to the outside of said housing, and wherein said pilot member comprises a rod member shiftable axially of said tube, and wherein said motor means comprises a fixed cylinder shell secured to the housing at each end of said tube and mounted concentrically with the tube, and a piston portion joined to each end of said tube, each of the piston portions being mounted for reciprocation within a cylinder shell, and forming with its cylinder shell a piston-cylinder fluid motor, each of said outlet means connecting with the interior of one of said piston-cylinder fluid motors.

18. Valve mechanism comprising a housing having inlet means for fluid under pressure, a pair of outlet means, and exhaust means, regulator means in the housing adjustable between an activating position wherein the inlet means is connected to one of the outlet means and the exhaust means is connected to the other outlet means, and a neutral position wherein the inlet and exhaust means are disconnected from both outlet means, and flow valve means in the housing operable when the regular means is in neutral position to accommodate flow of fluid from the exhaust means to one of said outlet means and from the other outlet means to the inlet means when the pressure of fluid at the exhaust means exceeds the pressure of fluid in said one outlet means and the pressure of fluid in said other outlet means exceeds the pressure of fluid at the inlet means.

19. In combination, an elongated cylinder, a piston reciprocative in the cylinder, a first conduit communicating with one end of the cylinder, a second conduit communicating with the opposite end of the cylinder, a reservoir for hydraulic fluid, control valve means having inlet means communicating with the reservoir through fluid pump means of the non-positive displacement type, a pair of outlet means each connected to one of the conduits, and exhaust means communicating with the reservoir.

20. The combination of claim 19 wherein the control valve means includes regulator means adjustable between an activating position wherein the inlet means is connected to one of the conduits and the exhaust means is connected to the other conduit, and a neutral position wherein the inlet and exhaust means are disconnected from both conduits, and flow valve means in the control valve means operable when the regular means is in neutral position to accommodate flow of fluid from the exhaust means to one of said conduits and from the other conduit to the inlet means when the pressure of fluid at the exhaust means exceeds the pressure of fluid in said one conduit and the pressure of fluid in said other conduit exceeds the pressure of fluid at the inlet means.

References Cited in the file of this patent
UNITED STATES PATENTS

| | | |
|---|---|---|
| 2,965,133 | Rice et al. | Dec. 20, 1960 |
| 2,969,045 | Clar | Jan. 24, 1961 |